(12) United States Patent
Leonardi et al.

(10) Patent No.: US 9,861,042 B2
(45) Date of Patent: Jan. 9, 2018

(54) STUMP CUTTING TOOTH ASSEMBLY

(71) Applicant: Leonardi Manufacturing Co., Inc., Weedsport, NY (US)

(72) Inventors: Joseph Leonardi, Auburn, NY (US); Bruce C. Jordan, Auburn, NY (US)

(73) Assignee: LEONARDI MANUFACTURING CO., INC., Weedsport, NY (US)

( * ) Notice: Subject to any disclaimer, the term of this patent is extended or adjusted under 35 U.S.C. 154(b) by 643 days.

(21) Appl. No.: 13/787,116

(22) Filed: Mar. 6, 2013

(65) Prior Publication Data

US 2013/0180625 A1   Jul. 18, 2013

Related U.S. Application Data

(62) Division of application No. 11/927,040, filed on Oct. 29, 2007, now Pat. No. 8,408,258.

(51) Int. Cl.
*A01G 23/06* (2006.01)

(52) U.S. Cl.
CPC .................. *A01G 23/067* (2013.01)

(58) Field of Classification Search
CPC .... A01G 23/067; A01G 23/091; B27G 13/10; B27G 13/00; B27G 13/12; B27L 7/02
USPC ........ 144/24.1, 218, 231–235; 241/170, 172, 241/173, 184; 83/223, 219, 220, 231, 83/235, 236, 39, 41, 37
See application file for complete search history.

(56) References Cited

U.S. PATENT DOCUMENTS

| | | | |
|---|---|---|---|
| 3,662,568 A | 5/1972 | Kashima et al. | |
| 3,873,038 A | 3/1975 | Wagstaff | |
| 4,246,765 A * | 1/1981 | Zabcik | E21B 17/07 464/20 |
| 4,589,458 A | 5/1986 | McCord, Jr. | |
| 4,714,204 A | 12/1987 | John et al. | |
| 5,655,581 A | 8/1997 | Craft | |
| 5,657,803 A * | 8/1997 | Kappel | A01G 23/067 144/24.12 |
| 5,740,714 A * | 4/1998 | Martin | B26D 7/2614 493/471 |
| 5,743,314 A * | 4/1998 | Puch | A01G 23/067 144/24.12 |
| 5,819,827 A | 10/1998 | Leonardi | |
| 5,863,003 A * | 1/1999 | Smith | B02C 18/225 241/186.35 |
| 5,996,657 A * | 12/1999 | Riesselman | A01G 23/067 144/218 |
| 6,076,895 A | 6/2000 | Ino et al. | |
| 6,138,725 A | 10/2000 | Leonardi et al. | |
| 6,213,931 B1 * | 4/2001 | Twardowski | A01G 23/067 125/3 |
| 6,435,234 B1 | 8/2002 | Paumier | |

(Continued)

*Primary Examiner* — Anthony Stashick
*Assistant Examiner* — Onekki Jolly
(74) *Attorney, Agent, or Firm* — Bond Schoeneck & King, PLLC; George McGuire; Frederick Price

(57) ABSTRACT

A stump cutting assembly mounted to a stump cutting wheel. Stump cutting assembly is a stump cutting tooth interconnected to the wheel by a holder or block that is fixed to wheel by welding or other equivalent process, an optional debris deflector and a fastener that interconnects tooth and deflector to holder. As wheel rotates about its axis of rotation, the tooth cuts away at wood or other debris in which it comes into contact through the side to side and/or longitudinal movement of a stump grinder unit.

4 Claims, 19 Drawing Sheets

(56) References Cited

U.S. PATENT DOCUMENTS

| | | | |
|---|---|---|---|
| 6,698,477 B1 * | 3/2004 | Bennington | A01G 23/067 |
| | | | 144/235 |
| 6,915,971 B2 * | 7/2005 | Pallmann | B27L 11/005 |
| | | | 144/174 |
| 7,086,432 B1 | 8/2006 | Falatok | |
| 7,204,744 B2 | 4/2007 | Lamprecht et al. | |
| 7,249,619 B2 | 7/2007 | Berkowitz et al. | |
| 7,484,541 B2 | 2/2009 | Green | |
| 2004/0244558 A1 | 12/2004 | Lowder et al. | |
| 2007/0193654 A1 * | 8/2007 | Bennington | A01G 23/067 |
| | | | 144/24.12 |

\* cited by examiner

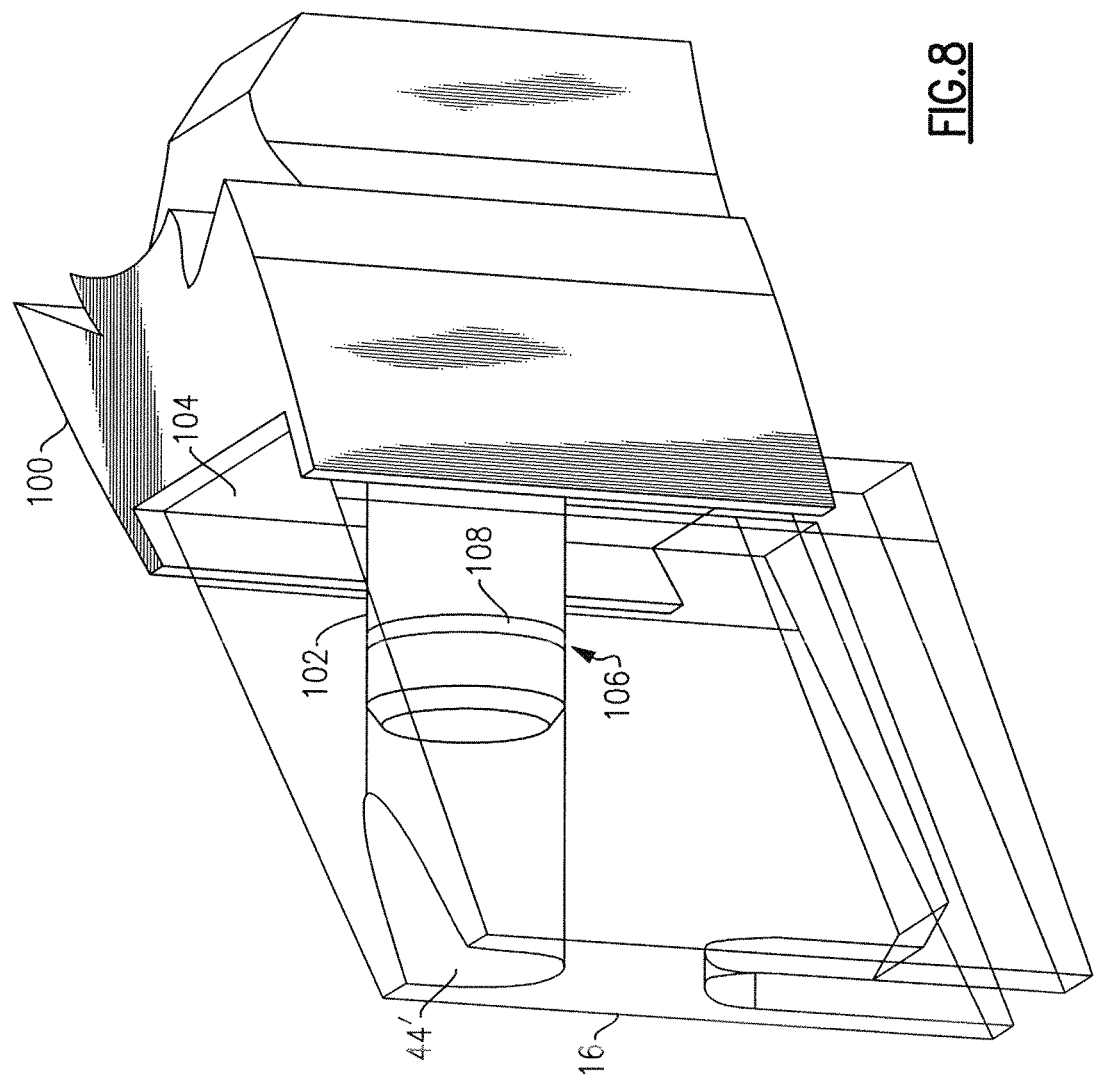

STUMP CUTTING TOOTH ASSEMBLY

CROSS-REFERENCE TO RELATED APPLICATIONS

The present application is a divisional of U.S. patent application Ser. No. 11/927,040, filed Oct. 29, 2007, now allowed and which, in turn, claims priority to U.S. Provisional Application No. 60/863,225, filed Oct. 27, 2006, the both of which are hereby incorporated in their entireties.

BACKGROUND OF THE INVENTION

The present invention relates generally to stump grinding teeth, and more particularly to an assembly that facilitates the mounting of a stump grinding tooth to a grinding wheel.

Stump grinders are well known in the art. Typically, the grinder comprises a wheel mounted by an axle to a motor. A plurality of cutting teeth are affixed about the periphery of the wheel, and include cutting tips, typically composed of carbide or similarly hard substances, brazed thereon. While rotating at high speeds, the wheel is traversed in a sideways motion relative to a tree stump with the teeth cutting into and grinding the stump. Continuously moving the wheel across the stump results in the teeth generally grinding the stump into chips.

While the wood generally degrades the edge of the cutting bits, oftentimes they come into contact with foreign objects embedded in the wood, such as rock, nails, or other hard substances. The impact with these objects accelerates the degradation of the cutting bits. Once the edge is worn beyond an acceptable limit, the tooth or teeth must be changed.

Traditionally, changing the teeth required the operator to use a drill or other tool to remove bolts that fasten a pocket to the wheel. The teeth, in turn, are clamped to the wheel by the pockets. This process is laborious, and with conventional teeth, the entire tooth has to be discarded and replaced with a new tooth. Thus, in addition, to the downtime associated with changing the teeth, the teeth themselves raise the expense associated with the grinding operation.

It is therefore a principal object and advantage of the present invention to provide a tooth assembly that reduces the labor associated with having to change a tooth on a grinding machine.

It is another object and advantage of the present invention to provide a tooth assembly that permits cutting bits to be replaced as opposed to having to replace an entire tooth, thereby lowering the cost to the lowest consumable.

Other objects and advantages of the present invention will in part be obvious, and in part appear hereinafter.

SUMMARY OF THE INVENTION

In accordance with the foregoing objects and advantages, the present invention provides a stump grinding assembly comprises of a wheel and peripherally mounted tooth assemblies. Tooth assemblies comprise individual grinding teeth held in place by a variety of connecting elements that provide for easy replacement of teeth.

BRIEF DESCRIPTION OF THE DRAWINGS

The present invention will be more fully understood and appreciated by reading the following Detailed Description in conjunction with the accompanying drawings, in which:

FIG. 8 is an embodiment of a tooth assembly according to the present invention.

DETAILED DESCRIPTION

Figure 1:
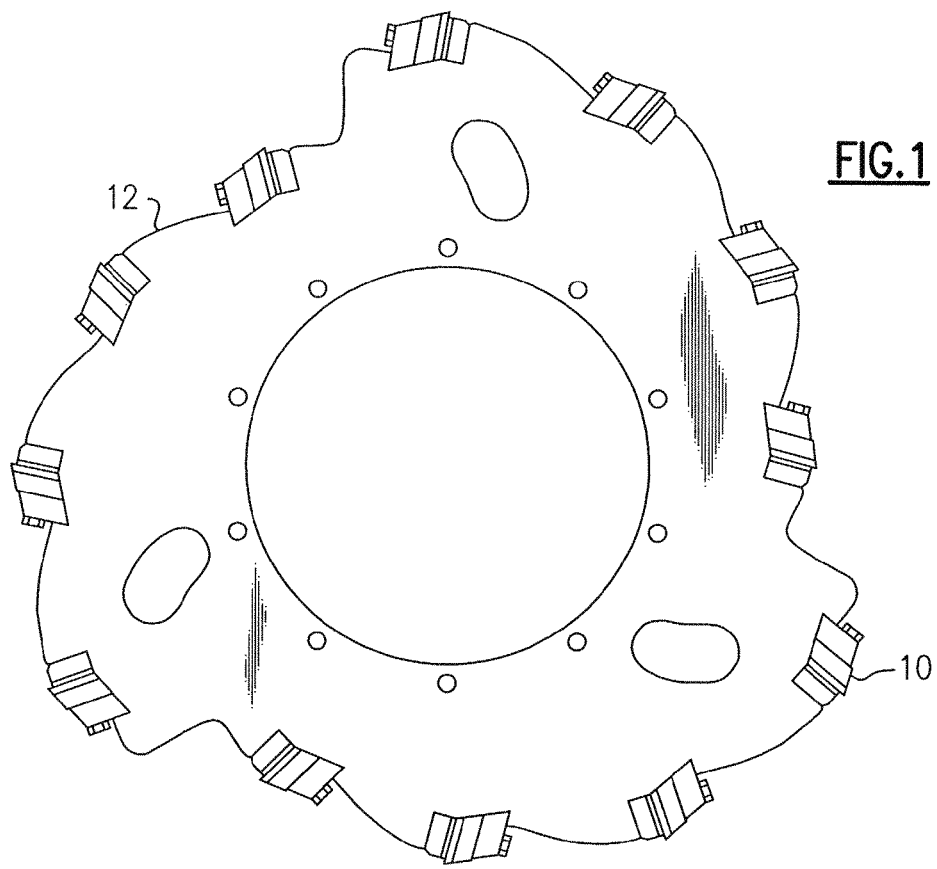
FIG. 1 is a side view of a wheel assembly according to the present invention.
Figure 2:
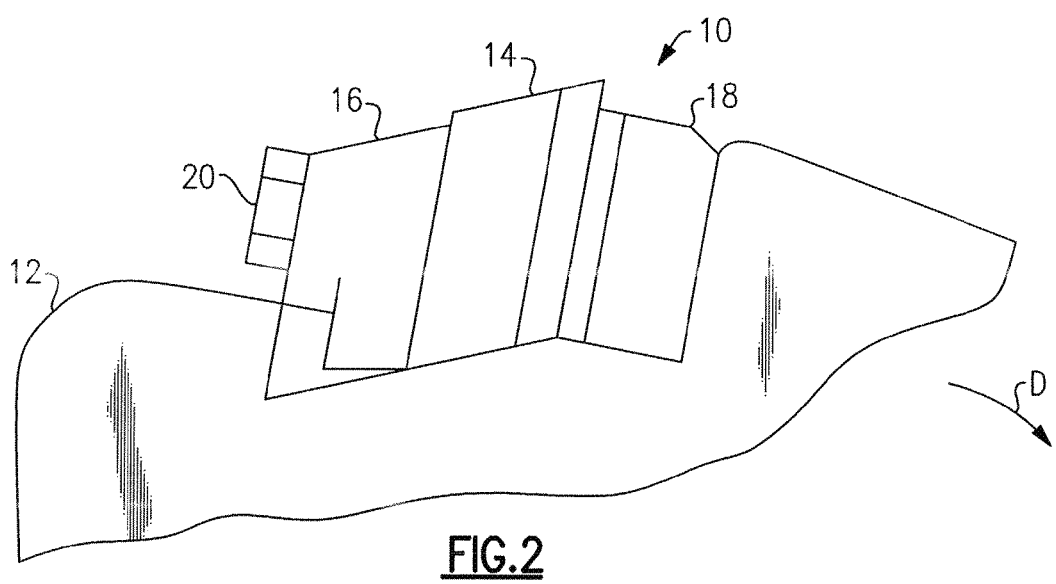
FIG. 2 is a tooth assembly according to the present invention.
Figure 3:
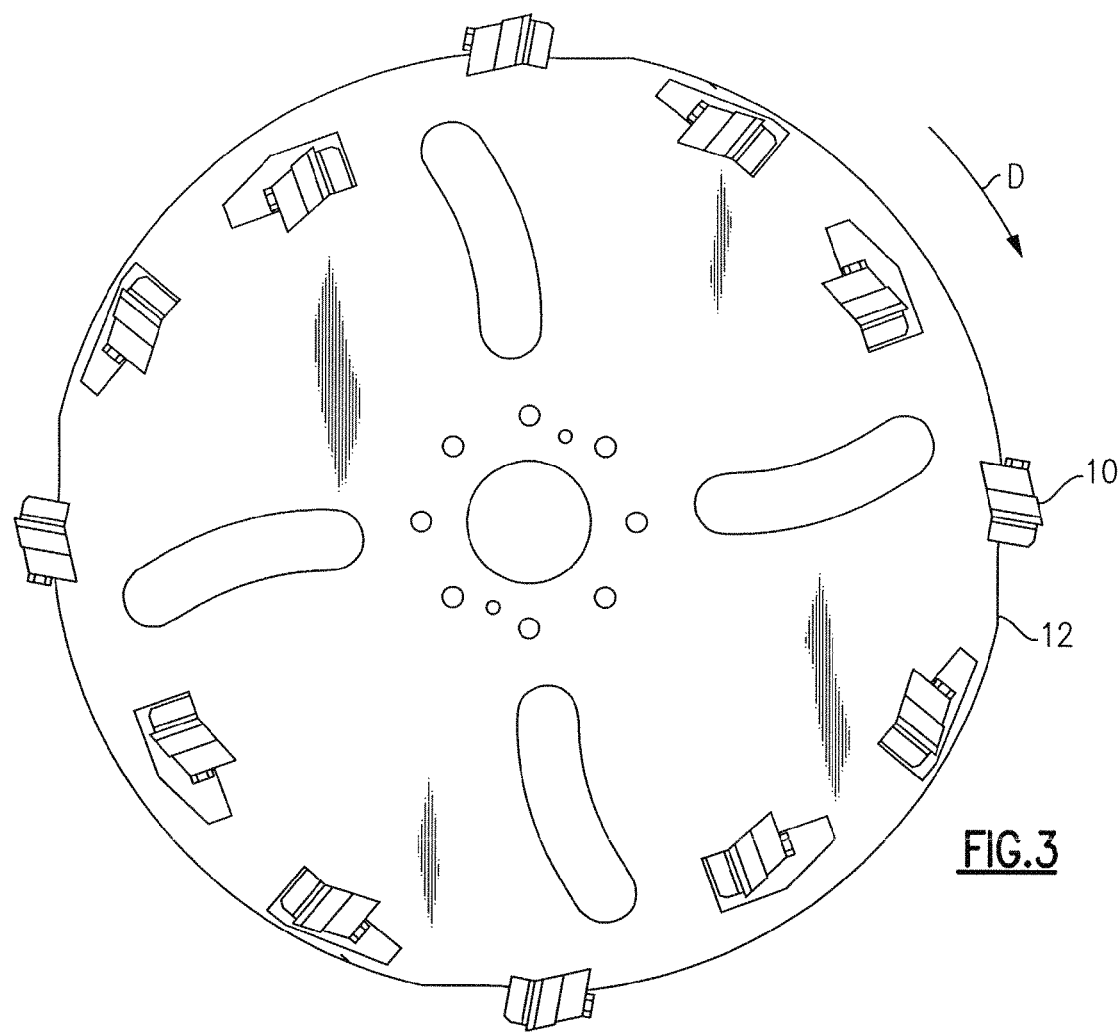
FIG. 3 is a side view of a wheel assembly according to the present invention.
Figure 4:
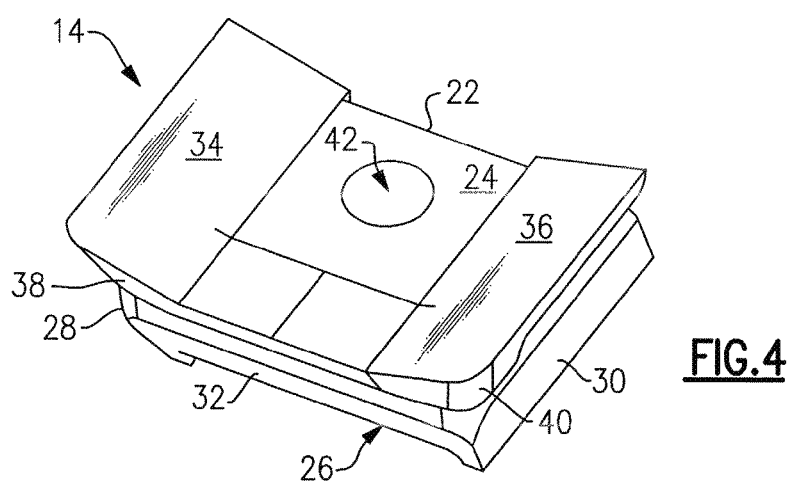
FIG. 4 is an embodiment of a tooth assembly according to the present invention.
Figure 5A:
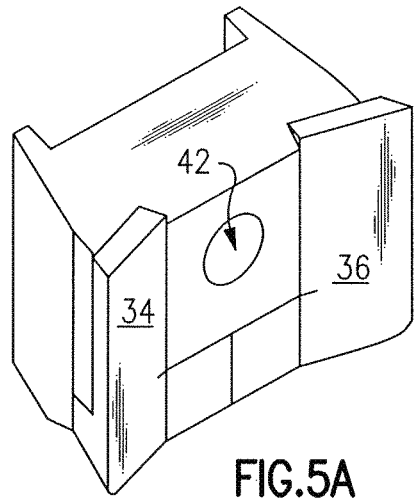
FIG. 5A-5D is embodiment of a tooth assembly according to the present invention.
Figure 5B:
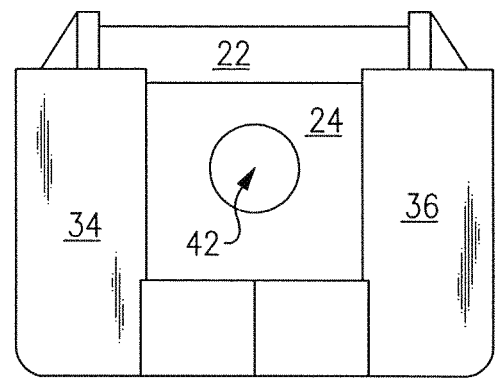
Figure 5C:
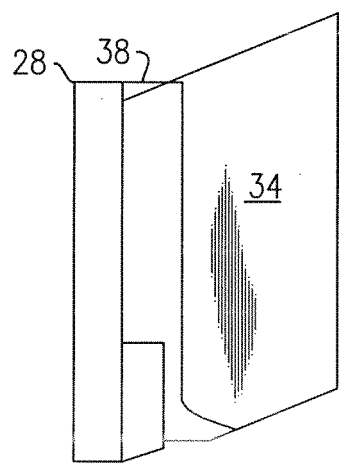
Figure 5D:
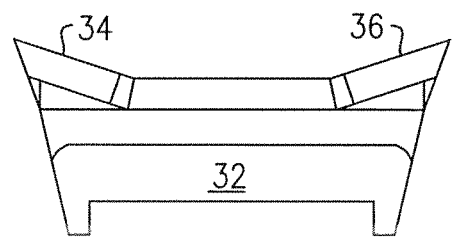
Figure 6A:
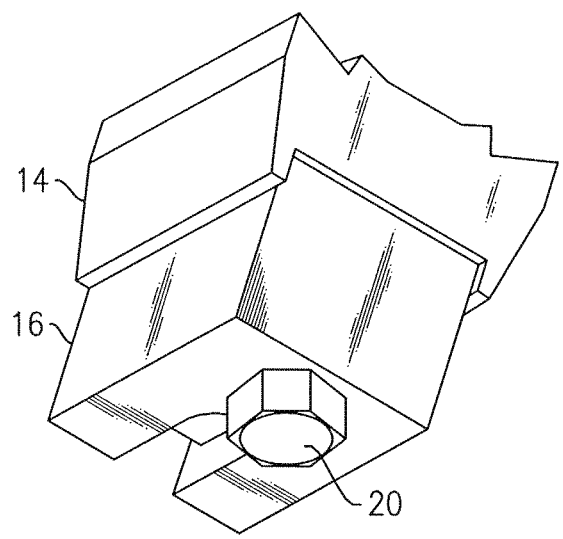
FIG. 6A-6D is an embodiment of a tooth assembly according to the present invention.
Figure 6B:
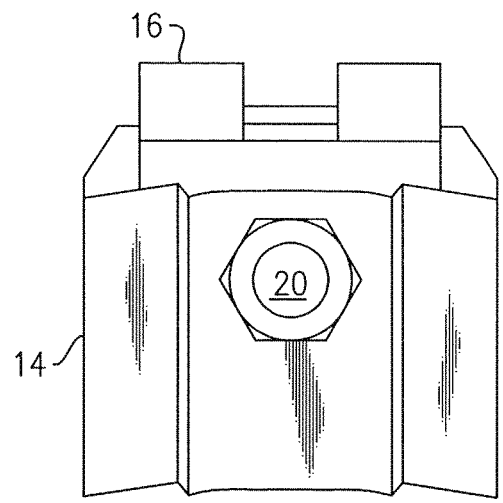
Figure 6C:
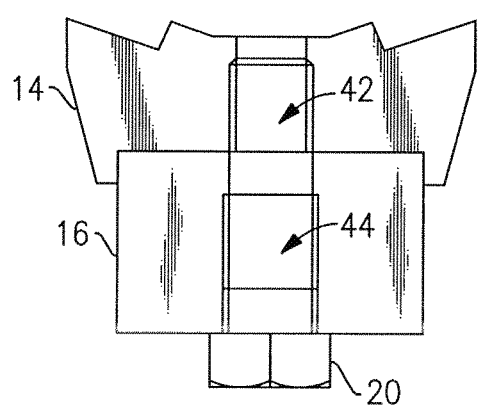
Figure 6D:
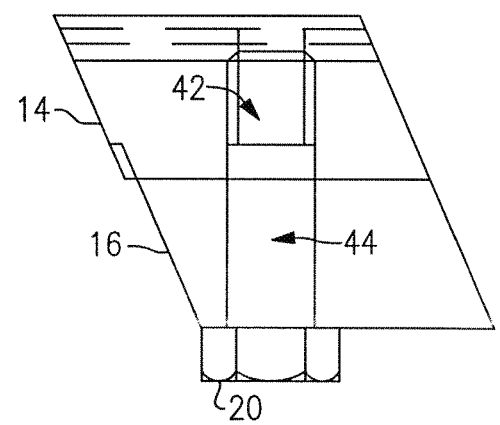

Referring now to the drawings wherein like reference numerals refer to like parts throughout, there is seen in FIGS. 1-3 a stump cutting assembly, designated generally by reference numeral 10, mounted to a stump cutting wheel 12. Stump cutting assembly 10 generally comprises a stump cutting tooth 14 interconnected to wheel 12 by a holder/block 16 that is fixed to wheel 12 by welding or other equivalent process, an optional debris deflector 18 and a fastener 20 that interconnects tooth 14 and deflector 18 to holder 16. As wheel 12 rotates in the direction indicated by arrow D about its axis of rotation R-R, tooth 14 cuts away at wood or other debris in which it comes into contact through the side to side and/or longitudinal movement of a stump grinder unit (grinding unit not shown).

With reference to FIGS. 4-7, tooth 14 comprises a body 22 that includes an upper surface 24, a lower surface 26, opposed side surfaces 28, 30, and a front surface 32. In its preferred form, tooth 12 includes cutting bits 34, 36, preferably composed of carbide, or a similarly hard material, brazened, or otherwise integrated, to shoulders 38, 40, respectively, formed at the interfaces of front surface 32 and side surfaces 28, 30, respectively, and at the boundary of lower surface 26. An opening 42 is formed through tooth 14 extending from its lower surface 26 up through its upper surface 24, for purposes of permitting passage of fastener 20 therethrough, as will be described in greater detail hereinafter. As seen in FIGS. 6A-D, tooth 14 may be comprise two elements supported by fastener 20 passing therethough.

Figure 7A:
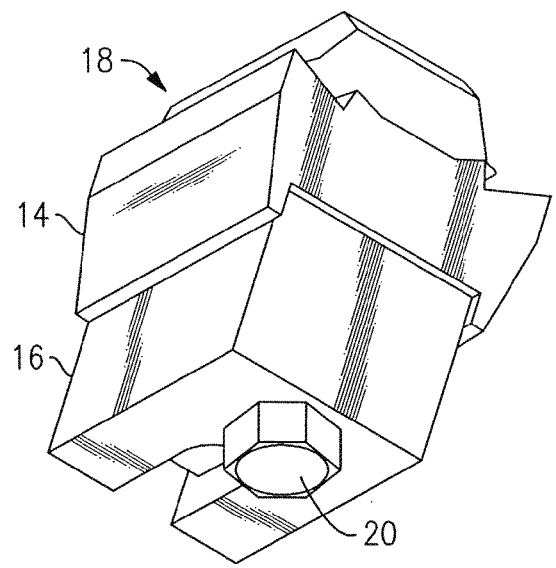
FIG. 7A-7D is an embodiment of a tooth assembly according to the present invention.
Figure 7B:
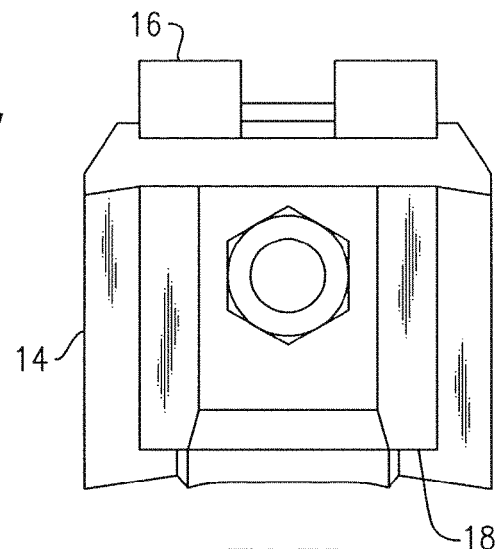
Figure 7C:
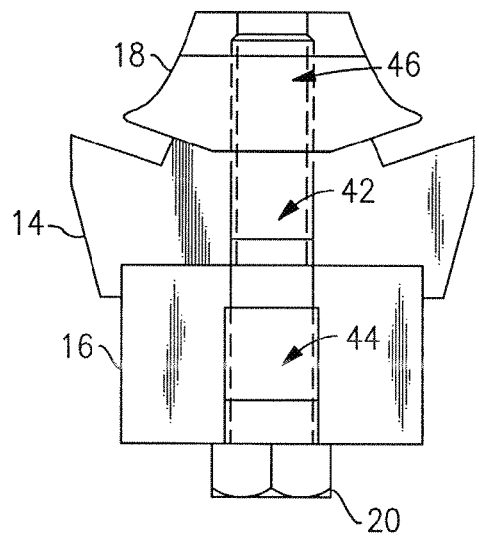
Figure 7D:
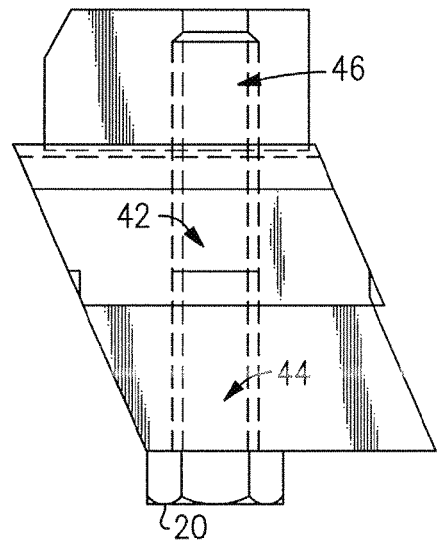
Figure 9A:
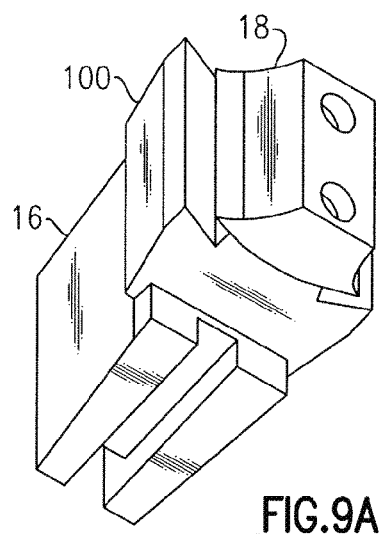
FIG. 9A-9D is an embodiment of a tooth assembly according to the present invention.
Figure 9B:
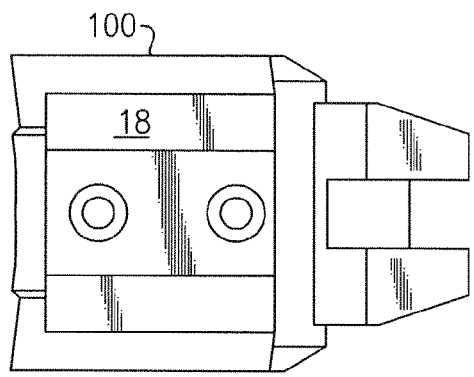
Figure 9C:
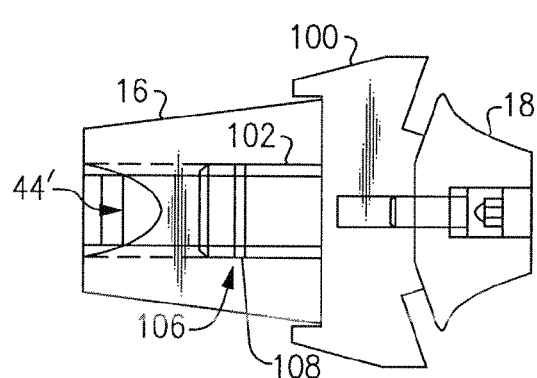
Figure 9D:
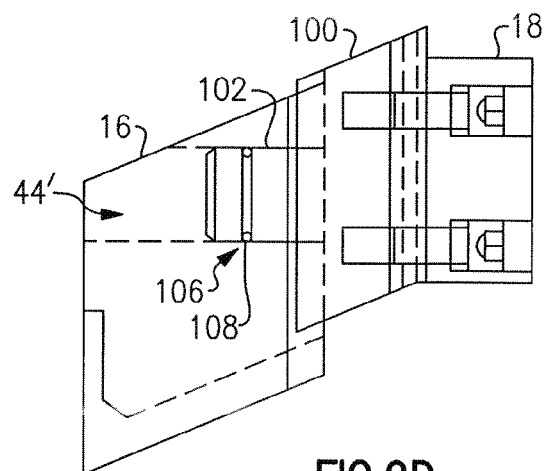

For purposes of fastening tooth 14 and deflector 18 to holder 16, holder 16 and deflector 18 also include openings 44, 46, respectively formed therethrough. Tooth 14, holder 16, and deflector 18 are assembled with openings 42, 44, 46, respectively, axially aligned, and fastener 20 then passing through opening 44 first, followed by openings 42 and 46, as seen in FIGS. 7A-C. Fastener 20 may be secured via a threaded connection or other conventional fastening systems. Therefore, if a stump grinder having assembly 10 is being used and a tooth 14 needs to be replaced, all that is necessary is for the operator to remove the fastener 20 associated with the impaired tooth 14, position a new tooth 20 in position, and re-fasten the assembly 10 with fastener 20.

In a second embodiment of the present invention shown in FIGS. 8 and 9A-D, a tooth 100 includes a post 102 extending outwardly from its upper surface 104. Post 102, which includes an annular groove 106 formed therein adjacent its free end and a sealing member 108, such as an O-ring, that is positioned in groove 106, is adapted to be inserted into opening 44' formed in holder 16'. A fastening element (not shown) is inserted through opening 44' and frictionally engages sealing member 108 in annular groove 106 to secure the interconnection between tooth 100 and holder 16'. To disassemble, an operator need only apply a pulling force to the end of the fastening member such that it disengages from annular groove 106.

Figure 10:
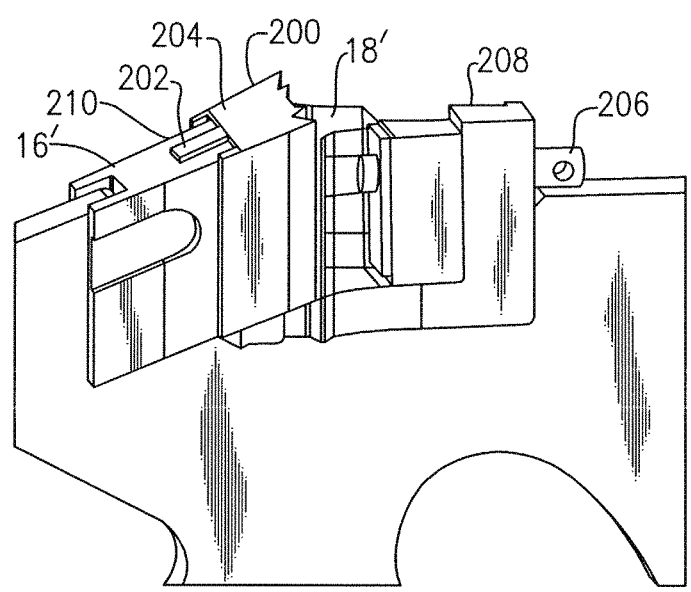
FIG. 10 is an embodiment of a tooth assembly according to the present invention.

In a third embodiment shown in FIG. 10, a tooth 200 is equipped with a male dovetail joint 202 formed on its upper surface 204 that interfaces with a corresponding female portion 210 formed in the lower surface of holder 16'. An opening formed in dovetail 202 is adapted to receive a threaded fastener 206, which can, for example, be in the form of a Phillips Head screw and that includes a retaining member 208 that securely engages the peripheral edge of wheel 12 and includes an angled extension that includes an opening through which fastener 206 passes and is positioned between the head of fastener 206 and holder 16".

Figure 11:
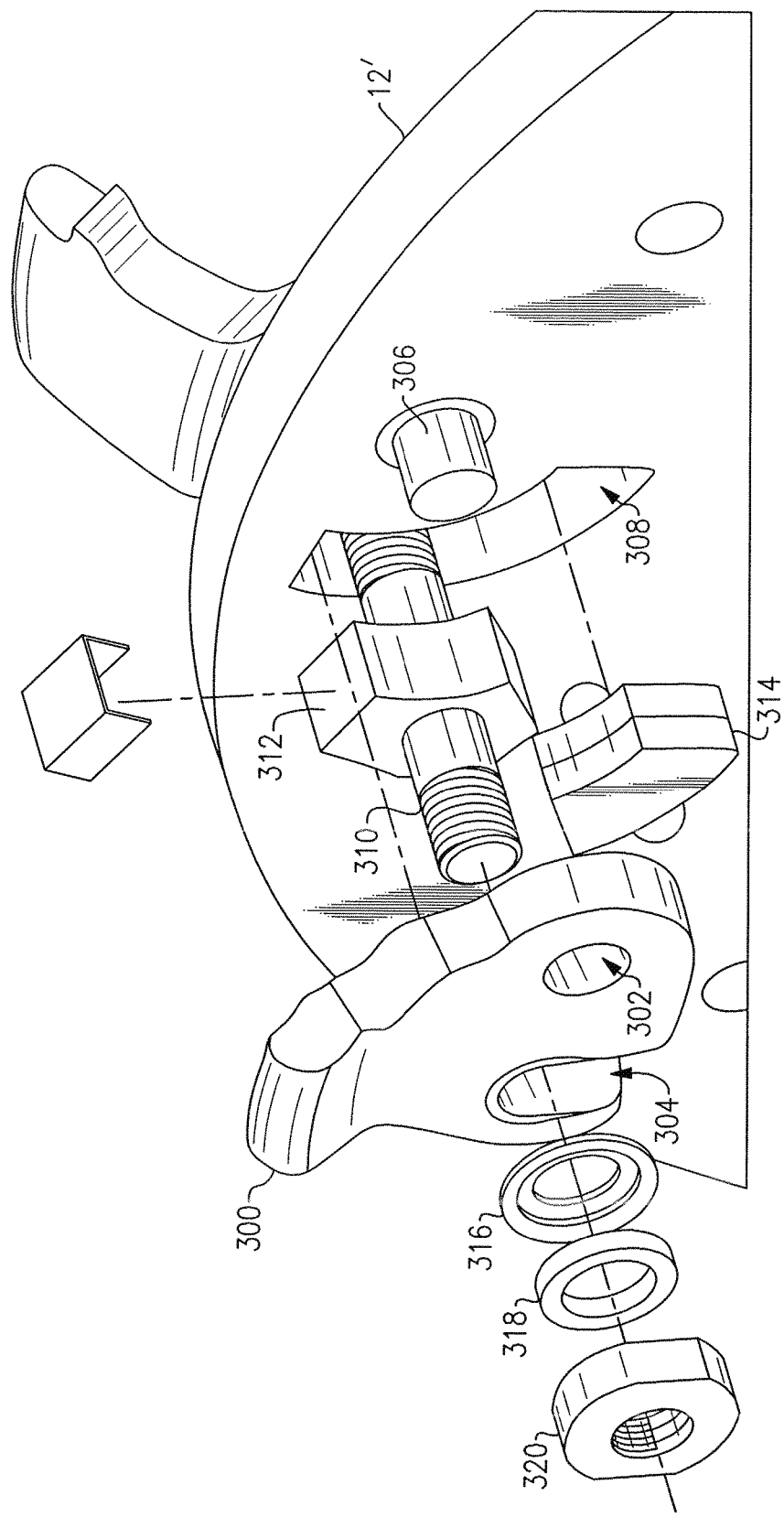
FIG. 11 is a perspective view of an embodiment of a wheel and tooth assembly according to the present invention.

In a fourth embodiment shown in FIG. 11, a tooth 300 attaches directly to a wheel 12' without a holder, but is nonetheless a quick-connect type of connection. In this embodiment, tooth 300 includes a body region with a first hole 302 formed therethrough and a second opening 304 (the opening 304 may be either open through the periphery of the tooth, as shown, or it may be a hole that is formed through the body region and is not open through the periphery of the tooth). A post 306 extends outwardly from opposing sides of wheel 12' (actually a pair of posts, one from each side, extend along a common axis), and a slot 308 is formed through wheel 12' a predetermined lateral distance from post 306. An axle 310 with opposed threaded ends, extends along an axis that is transverse to the plane of the wheel and through slot 308, and includes a medial body portion 312 that is shaped to snugly fit within and conform to the shape of slot 308. In addition, a shock absorbing member 314 is also positioned in the space within slot 308 and fills the space within the slot that is not occupied by body portion 312. Shock absorbing member 314 can be, for example, compressed wire mesh.

In attaching tooth 300 to wheel 12', opening 302 is passed about post 306, and opening 304 is passed over one end of axle 310 (thus the predetermined lateral spacing between post 306 and axle 310 is equal to the distance separating openings 302 and 304.) A washer 316 and O-ring 318 are then slipped over the end of axle 310, and a nut 320 is threaded onto the end of axle 310 to secure tooth 300 is position relative to wheel 12'. To change tooth 300, the operator needs only remove nut 320 using a wrench or pliers, pull the damaged tooth off of axle 310, place a new tooth in its place, and re-assemble washer 316, O-ring 318 and nut 320.

Figure 12A:
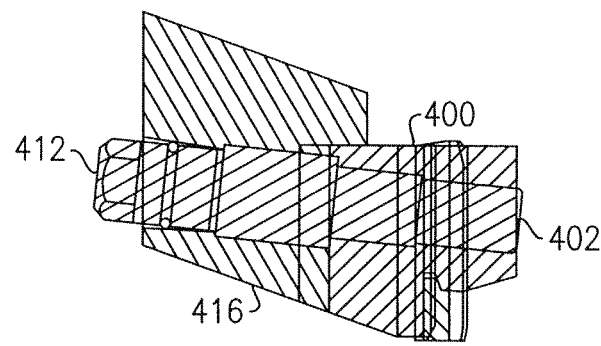
FIG. 12A-12C is a cross-section of an embodiment of a tooth assembly according to the present invention.
Figure 12B:
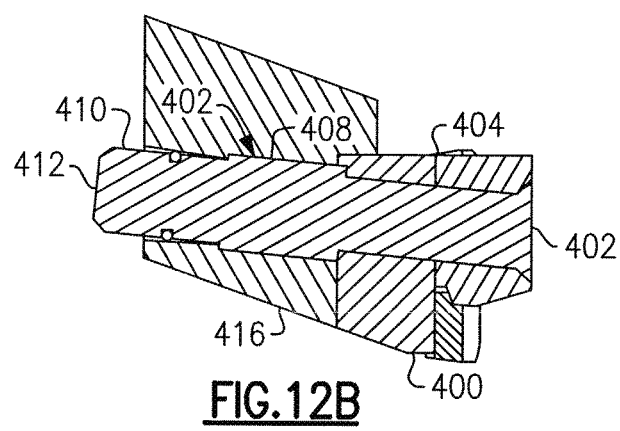
Figure 12C:
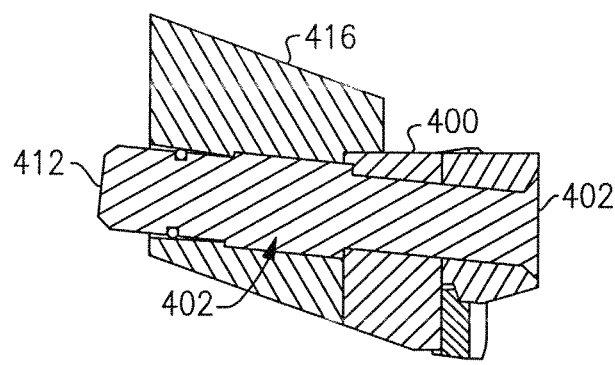
Figure 13A:
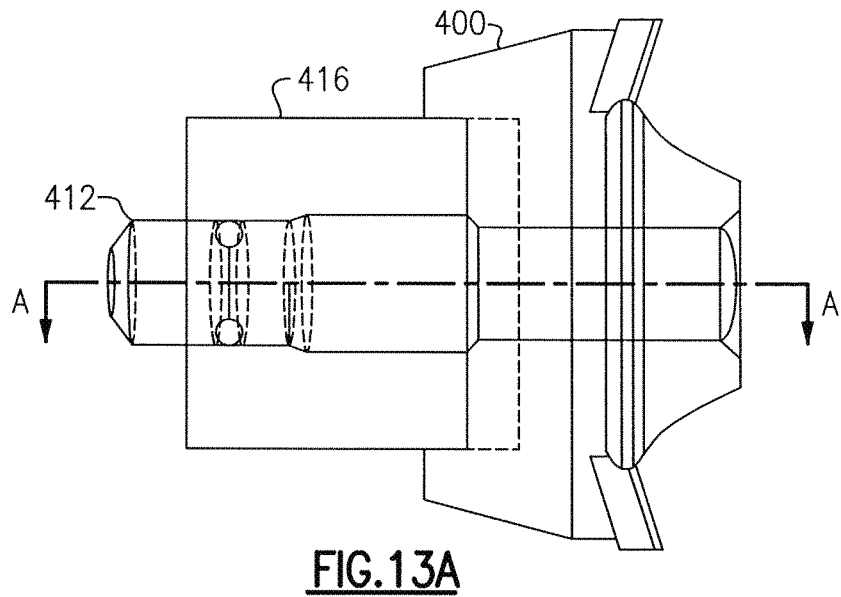
FIG. 13A-13B is a cross-section of an embodiment of a tooth assembly according to the present invention.
Figure 13B:
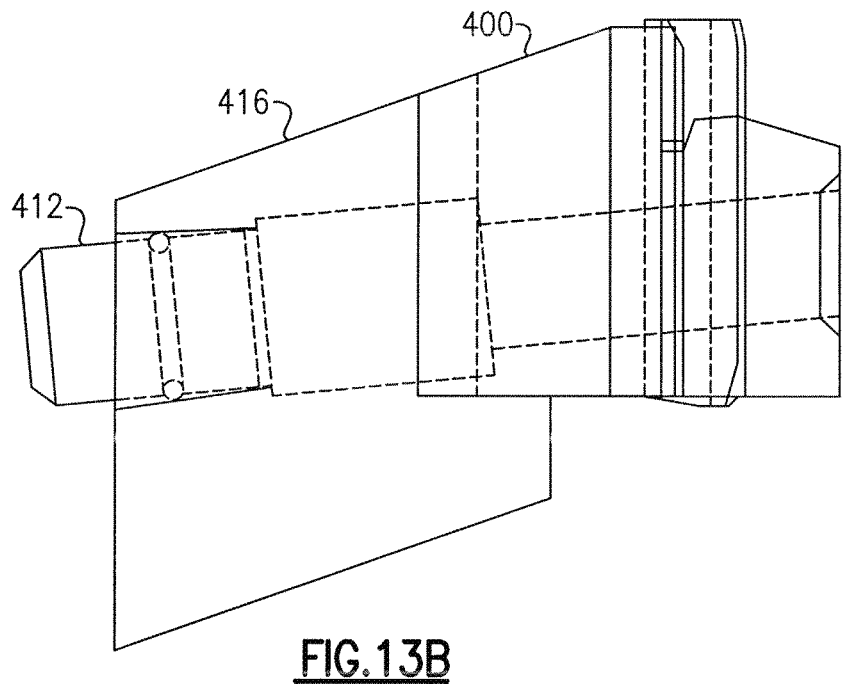
Figure 14A:
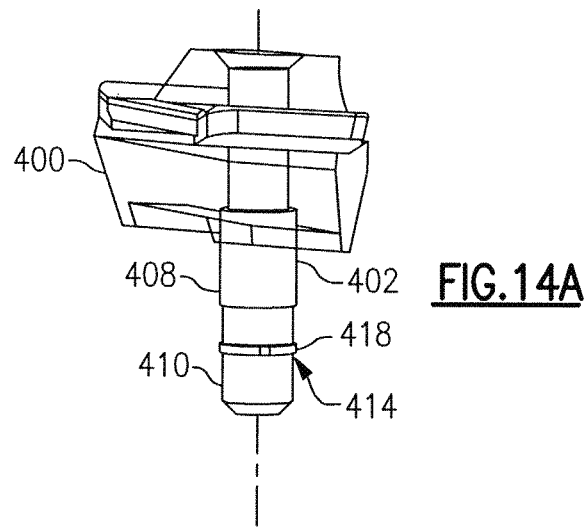
FIG. 14A-C is a perspective view of an embodiment of a tooth assembly according to the present invention.
Figure 14B:
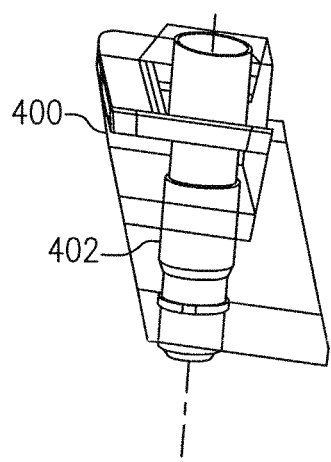
Figure 14C:
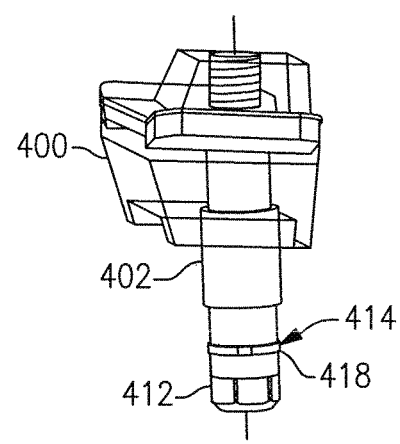

In a fifth embodiment shown in FIGS. 12-14, a tooth 400 includes an elongated post 402 (with respect to the second embodiment of the present invention shown in FIGS. 8 and 9A-D) that extends outwardly from its upper surface 404. Post 402 is dimensioned to extend entirely through holder/block 416, which includes an opening 406 formed therethrough for accepting post 402. Post 402 generally comprises a first portion 408 having a first diameter extending from tooth 400, a second portion 410 extending from first portion 408 and having a second diameter that is slightly smaller than the first diameter, and an end cap 412 at the terminal end of post 402. The diameter of first portion 408 is selected to allow frictional engagement with the interior surface of opening 406 formed through holder 416. As the diameter of second portion 410 is slightly smaller that first portion 408, post 402 is, at first, easily received within hole 418 and then, as post 402 is advanced further into opening 406, brought into frictional engagement with holder 416. Tooth 400 may be removed from holder 416 by applying an external force to end cap 412, thereby driving post 402 out of opening 406 until first portion 408 is no longer in frictional engagement with opening 406. Second portion 410 may include a circumferential groove 414 formed therein for housing a sealing member 418, such as an o-ring, for further frictional engagement with the interior of opening 406.

Figure 15:
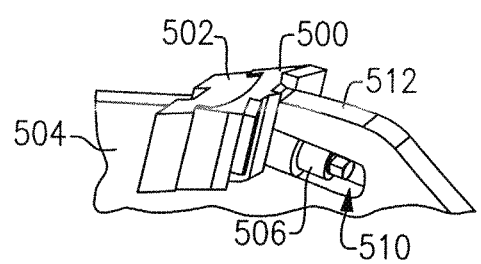
FIG. 15 is an embodiment of a tooth assembly according to the present invention.
Figure 16A:
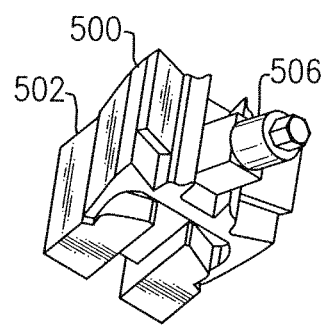
FIG. 16A-16D is an embodiment of a tooth assembly according to the present invention.
Figure 16B:
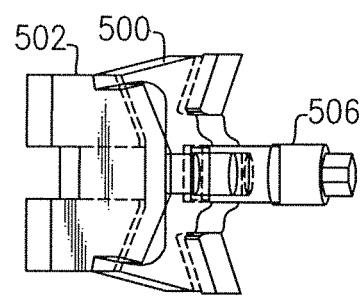
Figure 16C:
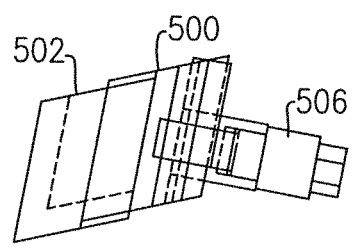
Figure 16D:
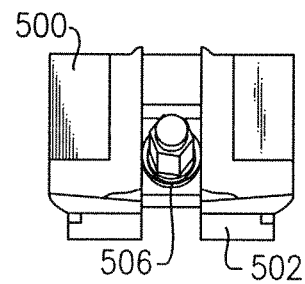
Figure 17A:
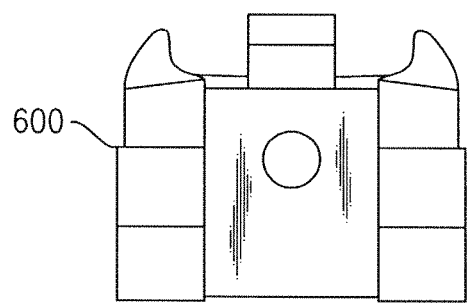
FIG. 17A-17E is an embodiment of a tooth assembly according to the present invention.
Figure 17B:
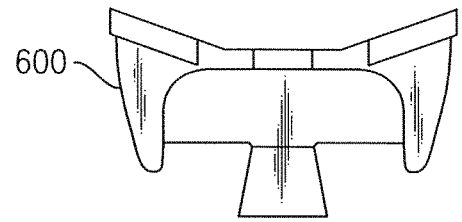
Figure 17C:
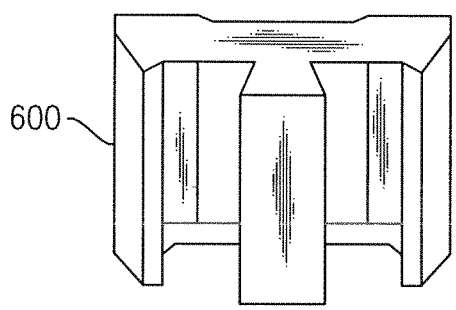
Figure 17D:
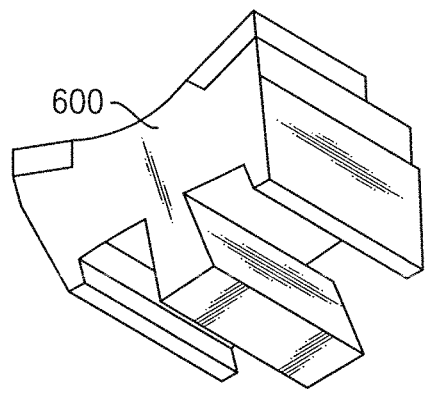
Figure 17E:
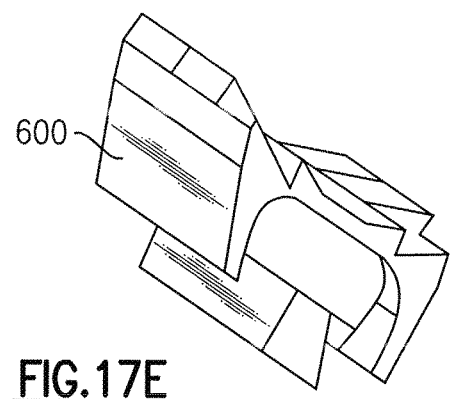

In a sixth embodiment shown in FIGS. 15-16, a tooth 500 and holder 502 are connected to a wheel 504 via a forwardly facing fastener 506 that extends through an opening 508 formed through tooth 500 to engage holder 502, thereby locking tooth 500 in place. Wheel 504 preferably includes a slot 510 formed in a peripheral portion thereof by an arm 512 that accepts and protects fastener 506 during operation of wheel 504.

Figure 18:
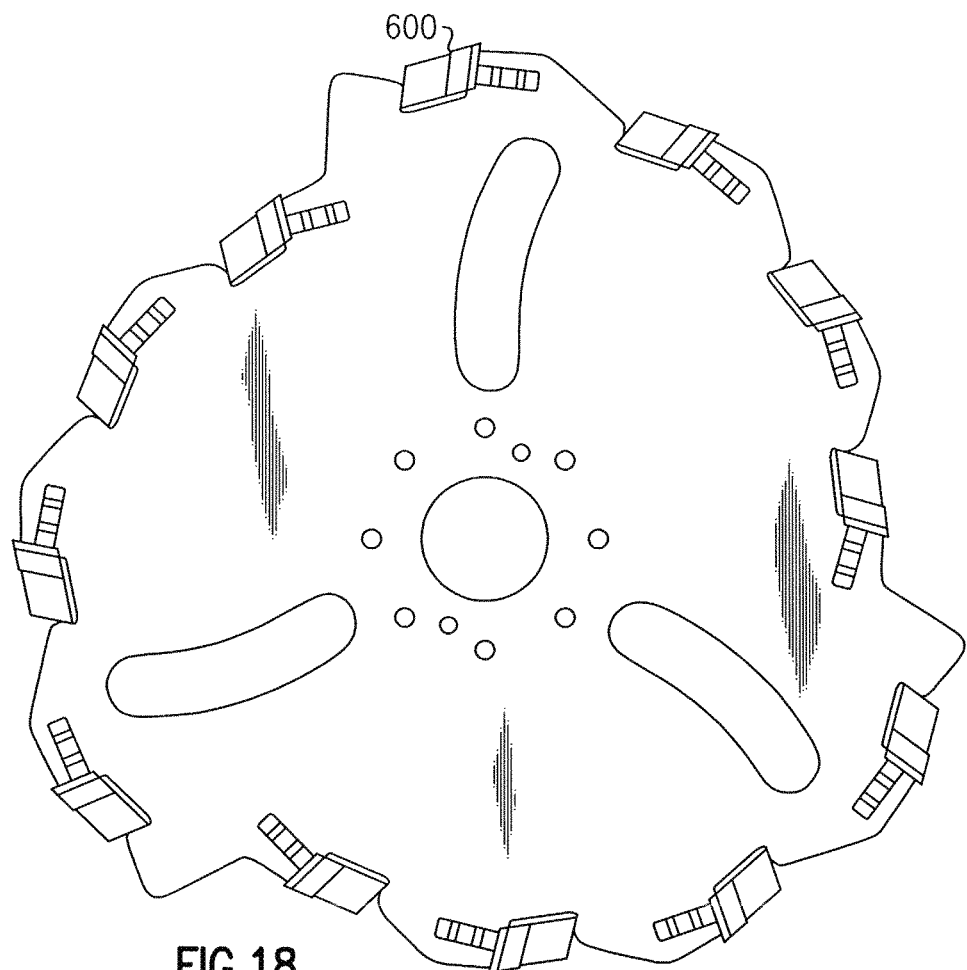
FIG. 18 is a side view of an embodiment of a wheel assembly according to the present invention.
Figure 19:
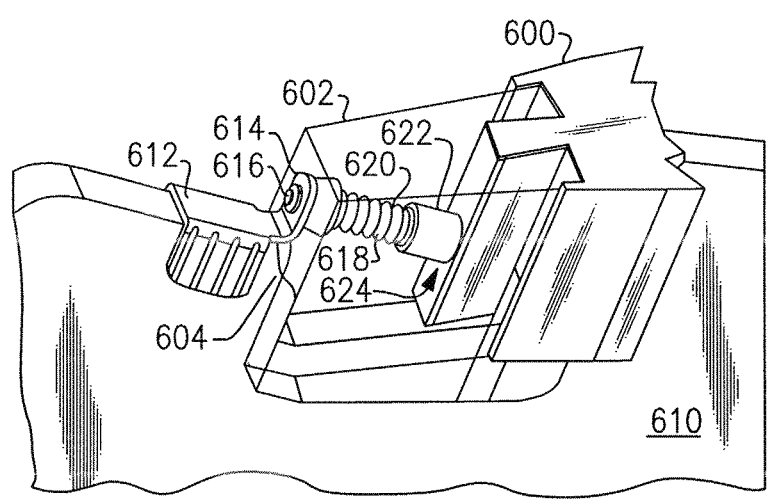
FIG. 19 is a perspective view of an embodiment of a tooth assembly according to the present invention.

In a seventh embodiment shown in FIG. 17-19, a tooth 600 including a dovetailed rear surface 602 is interlocked with a correspondingly dovetailed holder 604. Holder 604 abuts against a shoulder 606 formed in the peripheral edge of wheel 610 and is further held in place by a bracket 612. Bracket 612 including an outwardly extending flange 614, through which a pin 616 may pass for engagement with a spring assembly 618 positioned within holder 614. Spring assembly 618 includes a post 620 having a forward end 622 for engaging a corresponding detent 624 formed in tooth 600.

Figure 20:
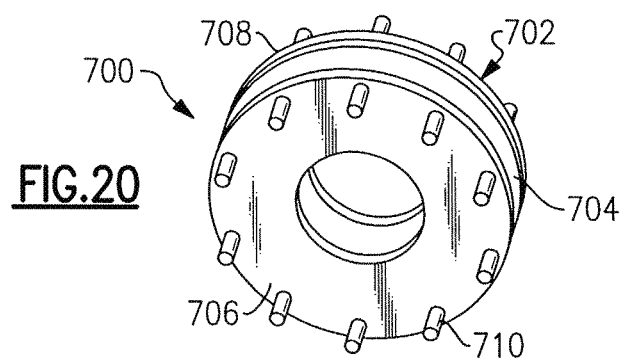
FIG. 20 is an embodiment of a wheel for a tooth assembly according to the present invention.
Figure 21A:
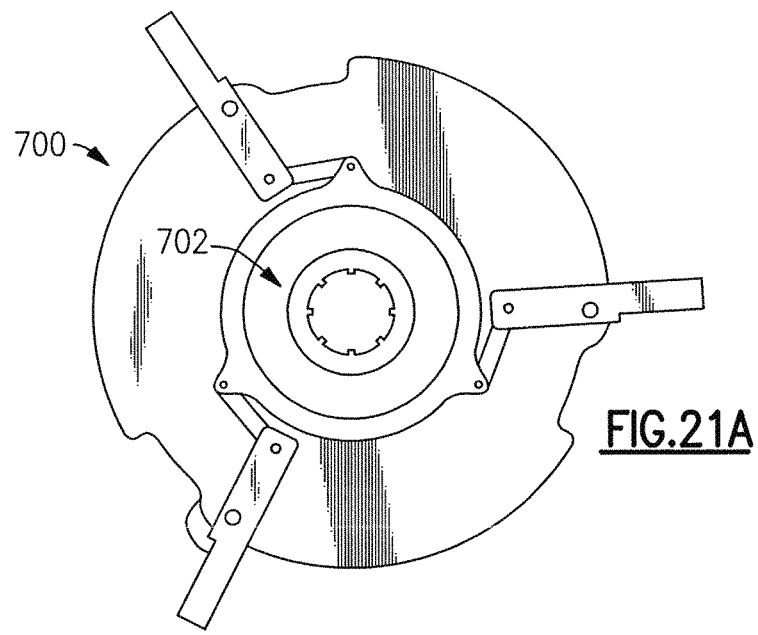
FIG. 21A-21B is an embodiment of a wheel for a tooth assembly according to the present invention.
Figure 21B:
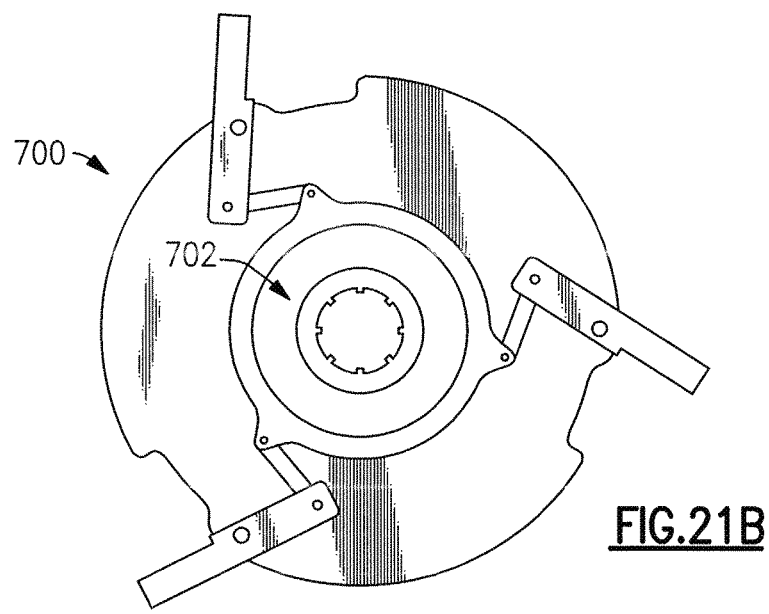

In an eighth embodiment shown in FIGS. 20-21, wheel 700 includes a centrally mounted isolator 702. Isolator 702 comprises a central disc 704 maintained between two opposing plates 706, 708. Disc 704 is preferably formed from a resilient material. Opposing plates 706, 708 are interconnected to grinding elements 710. As a result, vibrations caused by striking hard surfaces, such as rocks, will be transmitted to isolator and absorbed by disc 704.

Figure 22:
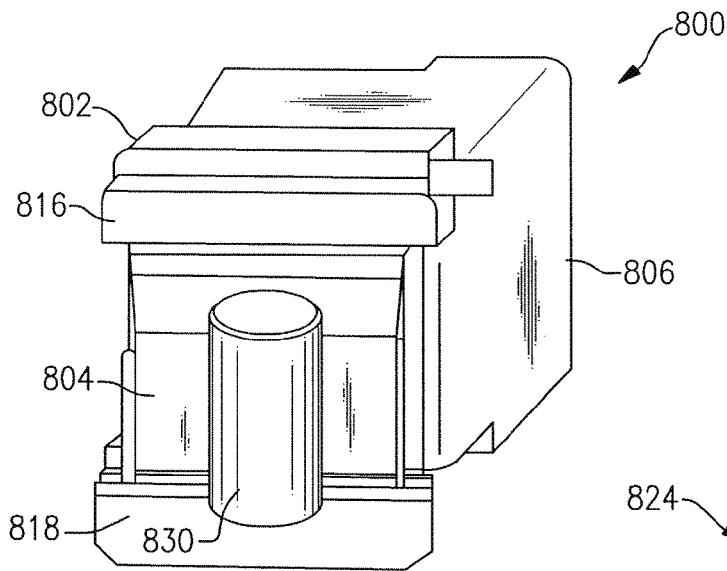
FIG. 22 is an embodiment of a tooth assembly according to the present invention.
Figure 23:
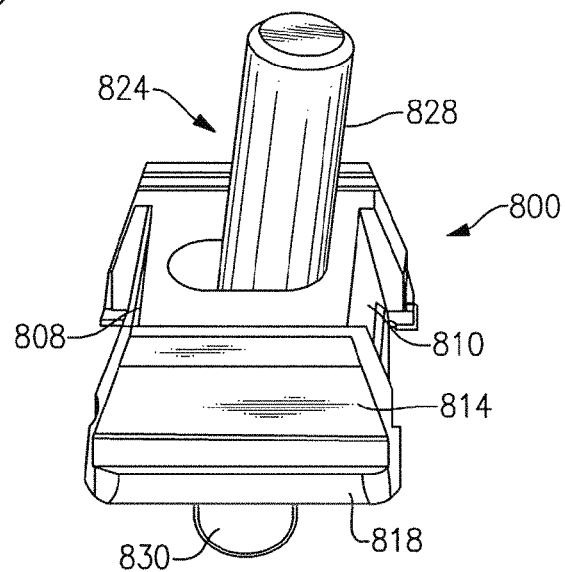
FIG. 23 is an embodiment of a tooth assembly according to the present invention.
Figure 24:
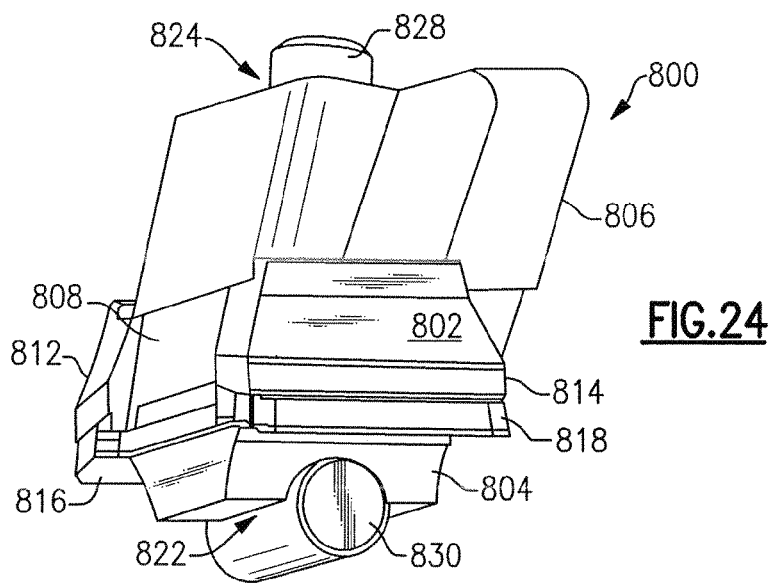
FIG. 24 is an embodiment of a tooth assembly according to the present invention.

In an ninth embodiment shown in FIGS. 22-24, a tooth assembly 800 comprising a tooth body 802, a deflector 804, and a holder 806. Tooth body 802 is symmetrical about transverse central, longitudinal plane and comprises opposed front and rear faces 808, 810 and sides 812, 814 to which cutting bits 816, 818 are secured, respectively. The front and rear faces 808, 810 are each recessed from the terminal ends of cutting bits 816, 818 and each taper inwardly from their lower edges to their upper edges.

Deflector 804 and holder 806 are adapted for positing below and above tooth body 802, respectively. The bottom surface 820 of deflector 804 includes a U-shaped channel 822 formed transversely there through for a reason that will be described hereinafter.

A series of co-axially, oval shaped openings 824 are formed through tooth body 802, deflector 804 and holder 806. T-shaped bolt 824 includes an elongated shaft 828 adapted to extend through an be pivotally movable within opening 824, and a cylindrical base member 830 that is adapted to be sealed within U-shaped groove 822. The upper end of shaft 828 is adapted to engage a stump grinding wheel to secure tooth assembly 800 to the wheel.

It should be noted that alternatives to a U-shaped groove 822 and cylindrical base 830 could be employed so long as the functionality of pivotal movement and securing shaft 828 are achieved. For instance, a hemi-spherical nut that sits in a correspondingly shaped, hemispherical indentation formed in the bottom of deflector 804 could be employed.

Due to the symmetry of tooth body 802 and the pivotal movement of shaft 828 within opening 824, if the cutting bits 816, 818 wear out, the tooth body 802 can be reversed to permit the opposite, non-worn edges of cutting bits 816, 818 to be used.

Figure 25:
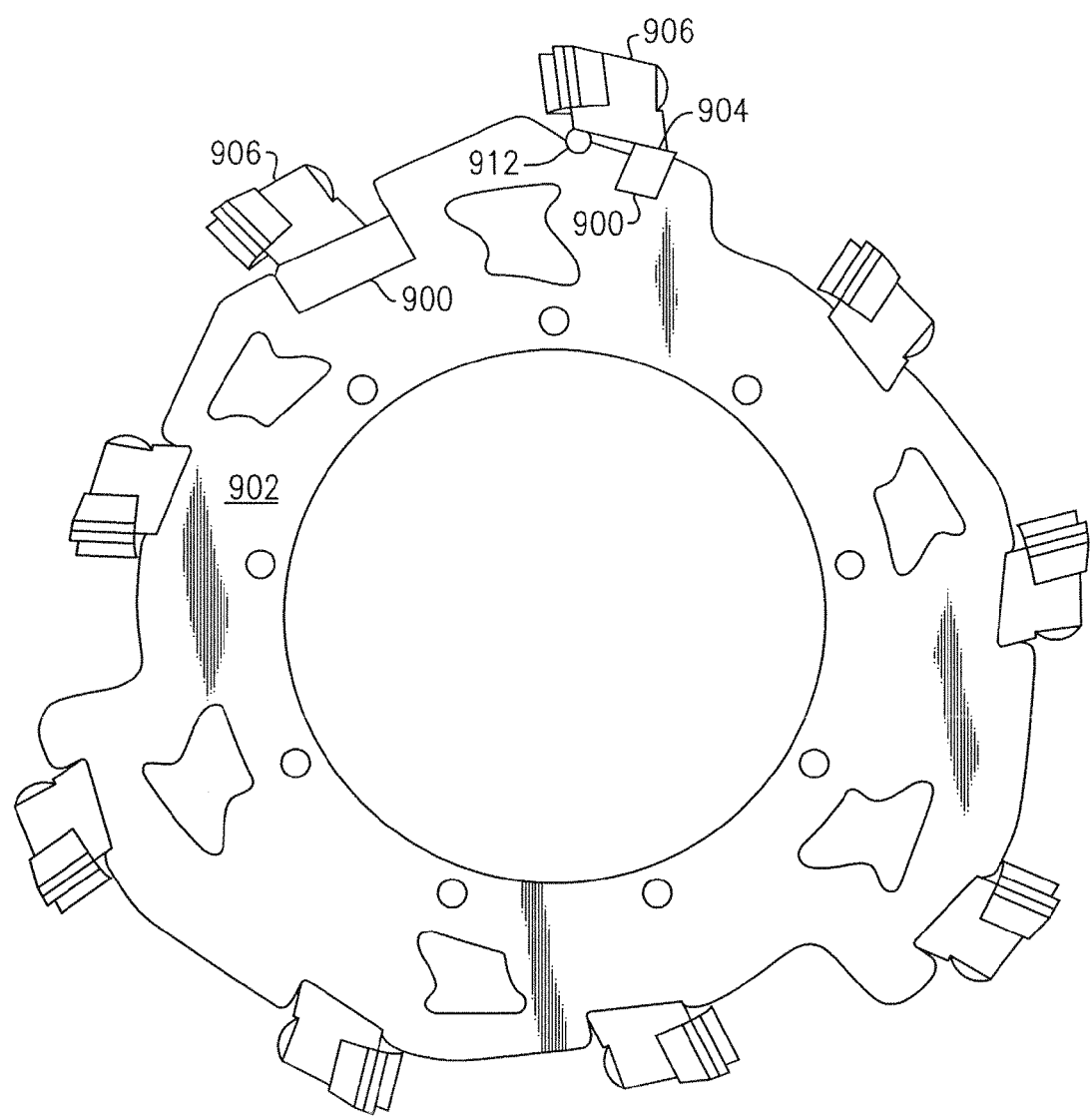
FIG. 25 is an embodiment of a shock absorbing system for a stump grinding apparatus.
Figure 26:
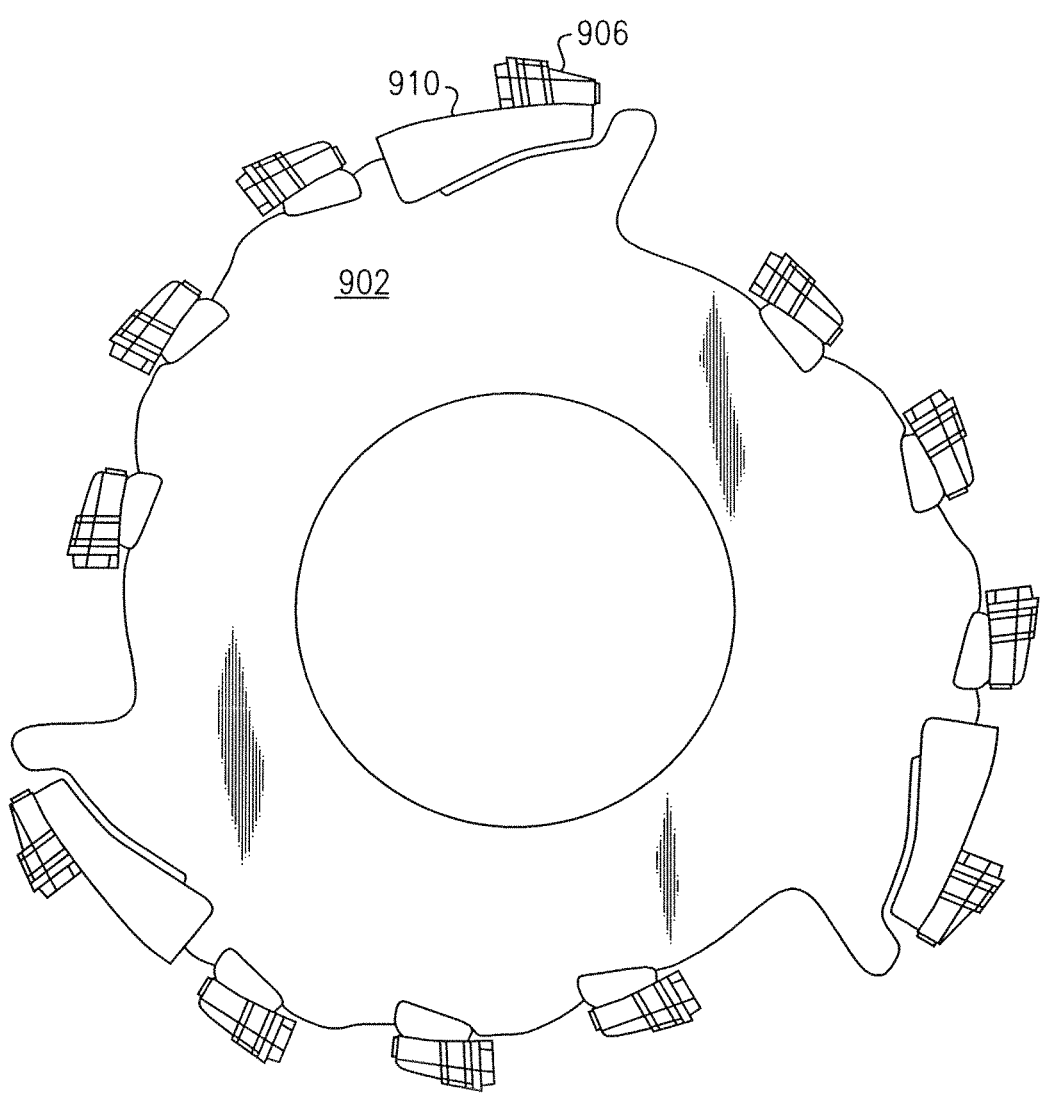
FIG. 26 is another embodiment of a shock absorbing system for a stump grinding apparatus.

With reference to FIGS. 25 and 26, alternate shock absorbing systems are shown. In FIG. 25, an elastomeric block 900 is mounted to wheel 902 and will be positioned between the wheel and the rear surface 904 of stump cutting tooth assembly 906. As an alternate to the elastomeric block 900, a compressed wire mesh block could be employed, as could a hydraulic, nitrogen, or other conventional piston and cylinder shock absorbing member (not shown). Furthermore, with reference to FIG. 26, a leaf spring 910 could be mounted to and between wheel 902 and tooth assembly 906. In addition, an electro-mechanical assembly comprising a force sensor and electronically controlled shock member could be employed in place of the mechanical absorbing members. In practice, as tooth assembly 906 rotates and its tooth impacts a stump, the force translated to the tooth will translate to rear surface 904 which in turn will be absorbed by shock absorbing member (e.g., elastomeric block, wire mesh block, leaf spring, etc.) 900.

With reference to FIG. 25, tooth assembly 906 could be mounted directly to shock absorbing member 900, in which case the shock absorber will absorb forces in multiple dimensions, whereas tooth assembly 906 could be mounted to wheel 902 via a hinge pin 912, in which case shock absorbing member 900 absorbs shock only in one dimension.

What is claimed is:

1. A stump cutter wheel with a shock absorbing system for a stump cutting tooth mounted thereon, comprising:
   a stump cutter wheel including an outside perimeter surface;
   a stump cutting tooth assembly body mounted to the stump cutter wheel and having a rear surface; and
   a shock absorbing member attached to the stump cutting wheel, wherein a portion of the shock absorbing member extends radially beyond the outside perimeter surface of the stump cutter wheel at a point where the shock absorbing member is attached to the stump cutting wheel, and is positioned between and in contacting relation to both the stump cutting wheel and said rear surface of said stump cutting tooth assembly body.

2. The stump cutter wheel according to claim 1, wherein said shock absorbing member comprises a leaf spring member.

3. The stump cutter wheel according to claim 1, wherein said shock absorbing member comprises an elastomeric block of material.

4. The stump cutter wheel according to claim 1, wherein said shock absorbing member comprises a compressed wire mesh block of material.

* * * * *